United States Patent Office 3,420,647
Patented Jan. 7, 1969

3,420,647
METHOD OF AND APPARATUS FOR THE MANUFACTURE OF FLAT GLASS ON A MOLTEN METAL BATH
Harold Charnock, Up Holland, near Wigan, England, assignor to Pilkington Brothers Limited, Lancashire, England, a corporation of Great Britain
Continuation-in-part of application Ser. No. 324,679, Nov. 19, 1963. This application Aug. 30, 1967, Ser. No. 670,820
Claims priority, application Great Britain, Nov. 20, 1962, 43,925/62
The portion of the term of the patent subsequent to Nov. 14, 1984, has been disclaimed and dedicated to the Public
U.S. Cl. 65—65                   12 Claims
Int. Cl. C03b 18/02; C03b 29/00

ABSTRACT OF THE DISCLOSURE

Glass in ribbon form is thermally conditioned as it is advanced along molten metal and is bent upwardly from the molten metal surface and subjected to controlled attenuation while it is freely suspended in a drawing chamber.

*Cross-references to related applications*

This application is a continuation-in-part of copending Serial No. 324,679, filed November 19, 1963 now abandoned.

*Background of the invention*

Field of the invention.—This invention relates to the manufacture of flat glass in ribbon form and in particular to the manufacture of flat glass of desired thickness from a layer of molten glass advancing along a bath of molten metal.

In the manufacture of flat glass in ribbon form during which the glass is supported on a bath of molten metal, the bath is preferably so constituted as to have all the characteristics fully described in U.S. Patent No. 2,911,759.

A main object of the present invention is to provide an improved method of manufacturing flat glass in ribbon form of different commercial thicknesses to suit different commercial demands.

A further object of the invention is to manufacture flat glass having a freedom from distortion and a fire finish lustre, which qualities are achieved by attenuating a distortion-free ribbon of glass produced on a bath of molten metal.

*Summary*

According to the invention a method of manufacturing flat glass of desired thickness is characterised by advancing glass in ribbon form along a molten metal surface, thermally regulating the glass while it is in contact with that surface until the glass is sufficiently viscous to be raised from the bath, drawing the ribbon upwardly from the bath by tractive effort applied to the ultimate ribbon of desired thickness, selectively setting the speed of upward drawing of the ultimate ribbon at a value greater than the rate at which the ribbon is advanced along the molten metal so as to attenuate the ribbon of glass during its upward movement, subjecting the ribbon to a temperature gradient during its upward drawing, and regulating that temperature gradient so that the glass is sufficiently stiffened to arrest further dimensional change by the time it has been attenuated to the desired thickness.

Further according to the invention a method of manufacturing flat glass of desired thickness is characterised by advancing glass in ribbon form along a bath of molten metal at a controlled rate, thermally regulating the glass while in contact with the bath so that the viscosity of the glass is in the range from $10^{5.5}$ to $10^{6.5}$ poises, drawing the ribbon upwardly from the bath by tractive effort applied to the ultimate ribbon of desired thickness, regulating said upward drawing so that the ultimate ribbon is drawn at a rate from 2 to 4 times the rate of advance of the glass ribbon along the bath thereby reducing the thickness of the glass ribbon as it is upwardly drawn, subjecting the glass ribbon to a temperature gradient as it is upwardly drawn, and regulating the temperature gradient so that the glass achieves a viscosity in the range from $10^{7.5}$ to $10^9$ poises by the time its thickness has been reduced to said desired thickness.

Preferably both the rate of upward drawing of the ribbon and the temperature gradient are so regulated as to achieve a reduction by half in the thickness of the ribbon in a height of from 3 to 7.5 metres.

The edges of the advancing ribbon of glass supported on the bath of molten metal may be in contact with nonwettable material or the side walls of the bath at the level of the surface of the bath may be formed by movable tiles which are advanced down the sides of the bath at the same velocity as the velocity of advance of the ribbon.

A preferred method according to the invention comprises delivering glass at a controlled rate to a bath of molten metal and advancing the glass along the bath under thermal conditions which ensure that a layer of molten glass is established on the bath, maintaining said glass layer in molten condition until there is developed on the surface of the bath a buoyant body of molten glass by permitting said layer to flow laterally unhindered to the limit of its free flow, thereafter continuously advancing the buoyant body in ribbon form along the bath, cooling the ribbon as it is advanced until it is sufficiently viscous to be raised from the bath, bending the cooled ribbon away from the bath surface, drawing the ribbon upwardly through by tractive effort applied to the ultimate ribbon of desired thickness, regulating the speed of upward drawing so that the ultimate ribbon is drawn at a rate from 2 to 4 times the rate of advance of the ribbon along the bath, and subjecting the ribbon to a temperature gradient in the range from 15° C./meter to 50° C./meter as it is upwardly drawn so that the suspended ribbon is attenuated by half by the weight of the glass acting against said tractive effort raising the ribbon by the time the ribbon achieves dimensional stability under the influence of said temperature gradient.

Advantageously a substantially uniform viscosity may be maintained across the ribbon passing through the bend.

The bend in the ribbon as it is raised away from the bath surface has the form of a catenary.

In a modified method according to the invention the position of removal of the ribbon from the bath surface is stabilised by guiding the upward bending of the ribbon away from the bath.

The width of the ribbon raised through the drawing chamber may be controlled by, for example, providing pairs of edge rolls or edge forks which grip the edges of the ribbon. The edge rolls or edge forks may be used to provide supplementary reaction to the tractive effort.

In a preferred method the drawing chamber extends vertically upwards from the bath and an annealing tower forms an upward extension beyond the top of the drawing chamber. In this embodiment of the invention the ribbon is drawn through the drawing chamber into the annealing tower so that the glass is suspended in the drawing chamber from the annealing tower and the tractive effort is applied to the ribbon by pairs of drawing rollers gripping the glass in the annealing tower, the speed of which rollers may be varied.

In another embodiment the ribbon drawn through the drawing chamber is bent over a bending roll for delivering into a horizontal annealing lehr.

The invention also comprehends a method of manufacturing flat glass wherein the ribbon is drawn through the drawing chamber by a bending roll about which the ribbon of glass emerging from the drawing chamber is bent for delivery into a horizontal lehr.

The invention also comprehends apparatus for manufacturing flat glass of desired thickness from a buoyant layer of molten glass supported on a bath of molten metal, comprising a tank structure holding a bath of molten metal and having an inlet to the bath, a roof bridging the tank structure, an upwardly elongated drawing chamber extending upwardly from said roof and spaced along the bath from said inlet, means for delivering glass at a controlled rate through the inlet to the bath and advancing the glass along the bath, temperature regulators maintaining thermal conditions along the bath to ensure that the glass is advanced along the bath as a body of molten glass in ribbon form and is then cooled until it is sufficiently viscous to be bent away from the bath into the drawing chamber, drawing rolls mounted above the top of the drawing chamber for applying regulated tractive effort to the ribbon to draw the ribbon upwardly through the drawing chamber, and adjustable temperature regulators in the drawing chamber to control the viscosity of the suspended ribbon of glass being raised through the chamber by establishing a temperature gradient in the chamber, whereby the ribbon of glass suspended in the drawing chamber is attenuated and is stiffened sufficiently to arrest any further dimensional change when it attains the desired thickness.

Preferably the configuration of the tank structure is such that at the bath surface the width of the tank is greater than the width of the body of molten glass in ribbon form advanced along the bath, so as to permit unhindered lateral flow to the limit of its free flow of the molten glass delivered to the bath to form said ribbon of glass.

In one embodiment of the apparatus according to the invention an annealing tower is mounted above the drawing chamber, and the drawing chamber has an outlet at its upper end through which the ribbon of glass is drawn into the annealing tower by pairs of drawing rolls engaging the ribbon of glass in the annealing tower, the ribbon being suspended in the drawing chamber from said rolls in the annealing tower.

The invention also comprehends flat glass produced by a method as set out above and sheets of glass cut therefrom.

*Brief description of the drawings*

In the drawings the same references indicate the same parts.

*Description of the preferred embodiment*

Figure 1:
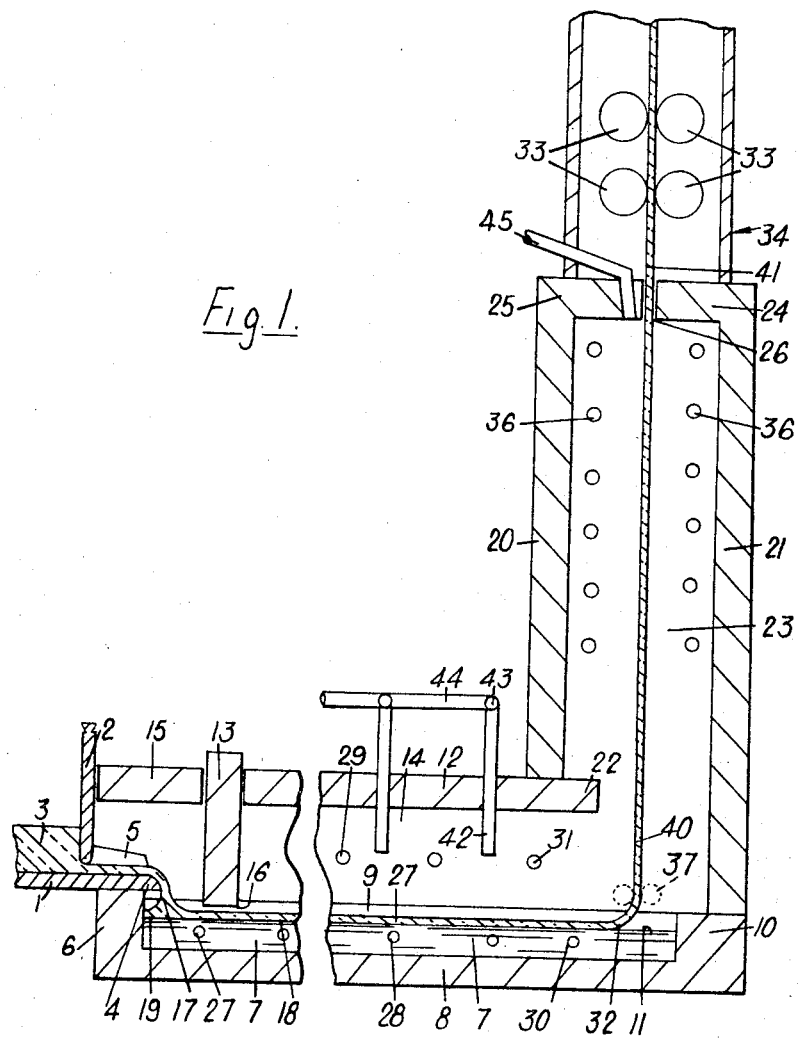
FIGURE 1 is a sectional elevation of apparatus for manufacturing flat glass in ribbon form according to the invention, illustrated by way of example, the apparatus including a tank structure holding a bath of molten metal, means for delivering molten glass at a controlled rate to the bath and a drawing chamber extending upwardly from the tank structure.

Referring to FIGURE 1 of the drawings, a forehearth of a continuous glass melting furnace is indicated at 1 and a regulating tweel at 2. Molten glass 3 flows from the furnace over the forehearth 1 to a spout which comprises a lip 4 and side jambs 5, one of which is indicated in FIGURE 1. The lip 4 and side jambs 5 form a spout of generally rectangular cross section.

The spout lip 4 overhangs an end wall 6 of the inlet end of a tank structure holding a bath 7 of molten metal. The molten metal bath has all the characteristics of the bath described in U.S. Patent No. 2,911,759 and is preferably a bath of molten tin or an alloy of tin having a specific gravity greater than glass. The tank structure further comprises a floor 8, side walls 9 and an end wall 10 at the outlet end of the bath. The floor 8, side walls 9 and end walls 6 and 10 form an integral structure.

The level of the surface of the bath 7 of molten metal is indicated at 11 and the configuration of the tank structure is such that the distance between the side walls 9 is wider than the width of the glass on the bath so that, as will be described below, the glass is advanced along the bath as a buoyant body of molten glass in ribbon form.

The tank structure supports a roof structure including a roof 12, a vertically adjustable end wall 13 at the inlet end of the bath, side walls 14 and a roof section 15 over the spout 4, 5. The roof structure thus provides a tunnel over the bath 7 and defines a headspace over the bath.

The adjustable end wall 13 at the inlet end of the bath is set to define a shallow inlet 16 for molten glass 17 flowing from the spout lip 4 on to the bath to establish a layer of molten glass 18 on the bath 7.

The vertical spacing of the lip 4 of the spout from the surface 11 of the bath is of the order of a few inches and is such as to ensure a heel 19 of molten glass being formed behind the glass flowing down the spout of the bath, which heel extends rearwardly under the spout lip 4 to the end wall 6 of the tank structure.

A drawing chamber extends upwardly from the roof structure, the drawing chamber being spaced along the bath from the inlet end of the bath. In the embodiment illustrated in FIGURE 1 the drawing chamber extends upwardly from the end of the bath opposite the inlet end.

The drawing chamber comprises a front wall 20 and a back wall 21 which extends upwardly from the end wall 10 of the tank structure. The end of the roof 12 extends into the drawing chamber as indicated at 22. The drawing chamber has side walls 23, one of which is shown in FIGURE 1 and is closed at the top by walls 24, 25 between which there is a narrow outlet 26 for the ribbon of glass.

The molten glass 17 delivered to the bath establishes a layer 18 of molten glass on the bath. The glass in the layer 18 is maintained in molten condition, for example at a temperature in the range 1000° C. to 950° C., as it is advanced along the bath until there is developed a buoyant body 27 of molten glass by permitting the glass in the layer 18 to flow laterally unhindered to the limit of its free flow. The required thermal conditions are maintained in the glass on the bath by thermal regulators 28 in the bath and 29 in the headspace over the bath.

The buoyant body 27 of molten glass is continuously advanced in ribbon form along the bath, and is cooled while it is in contact with the bath by operation of thermal regulators 30 and 31 respectively in the bath and in the headspace over the bath so that the ribbon becomes sufficiently viscous to be raised from the bath surface, for example at a temperature in the range 800° C. to 850° C. The cooled ribbon 32 is bent away from the bath surface and is raised through the upwardly extending drawing chamber, being sufficiently stiffened to be unharmed by drawing rolls when it emerges from the drawing chamber. The ribbon is freely suspended in the drawing chamber from pairs of drawing rolls 33 in an annealing tower indicated generally at 34 and mounted above the top of the drawing chamber. The rolls 33 draw the ribbon of glass upwardly through the outlet 26 in the top wall of the drawing chamber.

A required controllable temperature gradient is maintained in the drawing chamber by temperature regulators 36 mounted in the drawing chamber on either side of the plane of draw. The temperature conditions at the lower end of the drawing chamber are substantially the same as the temperature conditions at the outlet end of the bath so that there is little viscosity change in the ribbon 32 as it is bent away from the bath surface and raised into the drawing chamber. If the ribbon is permitted to bend away from the bath surface without any constraint then the bend will take the form of a catenary, but as indicated in FIGURE 1 the position at which the ribbon is raised from the bath surface may be stabilised by transverse pairs of edge rolls 37 which are mounted at the bottom of the drawing chamber and engage the edges of the ribbon of glass as it passes through the bend. In addition to stabilising the bend these edge rolls may provide control of the width of the ribbon as it is raised into the drawing chamber. The edge rolls may be free-running, or may be driven to provide a supplementary reaction to the tractive effort and to exert some tractive effort on the advancing cooled ribbon of glass 32. Alternatively edge forks may be used.

The temperature conditions in the drawing chamber are regulated by controlling the heaters 36. The viscosity of the ribbon of glass raised through the chamber is controlled until the ribbon of glass discharged through the outlet from the chamber is sufficiently stiffened to be unharmed when it is gripped between the pairs of drawing rollers 33 in the annealing tower 34.

The speed of the drawing rolls 33 can be regulated in well known manner to regulate the tractive effort applied to the ribbon of glass to raise it through the drawing chamber.

In the lower part of the drawing chamber the viscosity of the glass is such that it is attenuated by the weight of the suspended glass acting against the tractive effort raising the ribbon through the chamber and in order to achieve the required amount of attenuation to reduce the ribbon to a desired thickness and to cause the ribbon to have assumed a desired thickness when it is sufficiently stiffened to arrest further dimensional change, the temperature gradient in the drawing chamber is controlled while the tractive effort is regulated as more particularly described below with reference to the examples. The weight of the ribbon suspended in the drawing chamber acting downwardly provides a reaction to the tractive effort acting upwardly. The traction on the ribbon at the lower end of the drawing chamber is sufficient to bend the ribbon away from the bath surface.

The temperature gradient in the drawing chamber is such that when the ribbon of glass has achieved the desired thickness the viscosity of the glass is such that further dimensional change of the ribbon is arrested. The actual viscosity of the glass at which further dimensional change is arrested is dependent on the tractive effort applied by the rollers 33 to the stiffened ribbon 41 as it is raised through the outlet 26 from the drawing chamber. Adjustment of the heaters 36 controls the temperature gradient in the drawing chamber in relation to the tractive effort to determine the distance up the chamber at which this upper viscosity limit is reached.

The roof structure 12 of the bath is provided with ducting 42 connected by branches 43 to headers 44 through which a chemically suitable gas is fed into the headspace over the bath to create a plenum of protective atmosphere in the headspace. A duct 45 opens into the top of the drawing chamber and is also connected to the source of supply of the chemically suitable gas so that the plenum of protective atmosphere extends up through the drawing chamber. The outlet from the drawing chamber may include a gas seal through which the ribbon of glass passes as it is discharged from the drawing chamber. The maintenance of the plenum of protective atmosphere in the headspace over the bath may be assisted, for example, by a gas seal of the kind described in co-pending U.S. application No. 315,616 which produces outward laminar flow of protective gas through the outlet 26 to seal the outlet on either side of the ribbon of glass 41 against ingress of external atmosphere into the protective atmosphere in the drawing chamber. The inlet 16 may also be sealed by producing laminar flow of protective gas through the inlet in the same manner.

The protective gas is a gas which will not react chemically with the metal of the bath to produce contaminants for the glass thereby protecting the bath surface at the sides of the ribbon and under the bend where the viscous ribbon 32 is raised from the bath surface.

By the method and apparatus described above flat glass in ribbon form of different thicknesses can be produced to suit different manufacturing requirements, for example in the motor car trade, as set out in the following examples, all of which relate to soda-lime-silica glass.

*Example 1.*—A ribbon of flat glass 27 is produced on the molten metal bath 7 by unhindered lateral flow of molten glass on the bath. The ribbon of glass 27 is 5 meters wide and 7 mm. thick and is advanced along the bath at the rate of 90 meters/hour.

Temperature regulation of the advancing ribbon ensures that the temperature of the ribbon of glass 32 when it reaches the bend is about 850° C., the viscosity of the glass being $10^{5.8}$ poises. The edge rolls 37 are not used.

The speed of the drawing rolls 33 is such that the speed of the ribbon is increased by a factor of 4 so that the rate of draw of the ultimate ribbon 41 is 360 meters/hour. In the drawing chamber the temperature of the glass is reduced to 700° C. in a height of 3 meters, by regulation of the heaters 36 to achieve a temperature gradient of 50° C./meter to which the glass is subjected. In the height of 3 meters the ribbon of glass is attenuated to a width of 2.5 meters and a thickness of 3.5 mm. and by the time the glass has cooled to 700° C. its viscosity is $10^{8.3}$ poises and there is no further dimensional change.

The ribbon of 3.5 mm. glass is then annealed in the tower 34 positioned above the drawing chamber.

*Example 2.*—In the same way as in Example 1 a ribbon of float glass 5 meters wide and 7 mm. thick is produced and is advanced along the molten metal bath at 90 meters/hour.

The ribbon is cooled to 800° C., so that its viscosity is $10^{6.5}$ poises and is then drawn upwardly through the drawing chamber where it is subjected to a temperature gradient of 20° C./meter.

The ribbon is drawn upwardly at a rate of 360 meters/hour and is attenuated to a ribbon 2.5 meters wide and 3.5 mm. thick in a height of 6.25 meters by which time the temperature of the glass is 675° C. and its viscosity $10^{8.8}$ poises.

*Example 3.*—The initial ribbon of glass 32 is 2.5 meters wide and 6 mm. thick and is advanced along the molten metal bath at the rate of 230 meters/hour.

The temperature of the ribbon at the bend is 850° C. corresponding to a viscosity of $10^{5.8}$ poises and the temperature gradient in the drawing chamber is 40° C./meter. Edge rolls 37 grip the margins of the ribbon at the bend.

The rate of draw is doubled so that the rate of draw of the ultimate ribbon is 460 meters/hour. In a height of 3 meters the ribbon is attenuated to a thickness of 3 mm. but retains its width of 2.5 meters. Attenuation ceases when the temperature of the glass is about 730° C., the viscosity of the glass then being about $10^{7.7}$ poises.

*Example 4.*—A ribbon of glass 2.5 meters wide and 3 mm. thick is produced from a float ribbon 2.5 meters wide and 6 mm. thick which is advanced along the molten metal bath at 230 meters/hour and is at a temperature of 800° C. (viscosity $10^{6.5}$ poises) as it is gripped by the edge rolls 37 and drawn upwardly into the drawing chamber.

The speed of the ultimate 3 mm. ribbon is 460 meters/hour and the ribbon is subjected to a temperature gradient of 15° C./meter as it is drawn upwardly.

Attenuation is completed after the upward travel of the glass through a height of 7.5 meters by which time the temperature of the glass is 685° C. (viscosity $10^{8.7}$ poises).

By suitable inter-related regulation of the factor of increase in the rate of advance of the ribbon and the temperature gradient in the drawing chamber the attenuation of the ribbon may not be so great, for example a reduction in thickness of the ribbon by ⅓ may be achieved with a velocity increase of three times.

Figure 2:
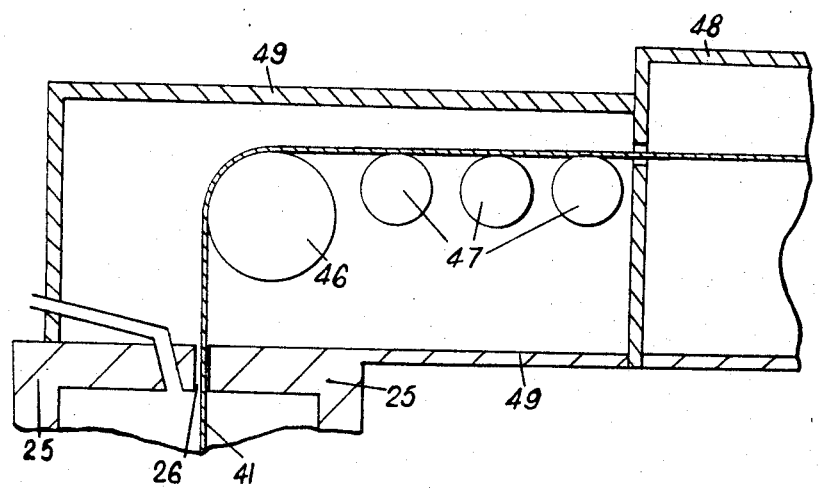
FIGURE 2 is a sectional elevation of a modified apparatus for bending the ribbon of glass discharged from the drawing chamber and delivering the ribbon to a horizontal annealing lehr.

A modification of the apparatus of FIGURE 1 is illustrated in FIGURE 2. A bending roll 46 is mounted above the top end walls 23 and 25 of the drawing chamber, the roll 46 being so positioned that the ribbon of glass 41 emerging from the drawing chamber through the outlet 26 is bent over the bending roll on to the supporting rollers 47 which deliver the ribbon 41 into a horizontal annealing lehr 48. The speed of the bending roll 46 and the supporting rolls 47 can be varied to regulate the tractive effort applied to the ribbon of glass, and the bending roll 46 and supporting rolls 47 are enclosed by walls 49 to provide an inlet chamber to the annealing lehr, in which inlet chamber protective atmosphere is maintained by the flow of protective gas outwardly through the outlet 26 from the drawing chamber.

The invention thus provides a method and apparatus for manufacturing flat glass of desired thickness from a buoyant layer of molten glass supported on a bath of molten metal which glass of desired thickness has all the advantages of float glass which has been advanced along a bath of molten metal, namely a lustre of fire finish quality and freedom from distortion.

We claim:

1. A method of manufacturing flat glass of desired thickness, characterised by advancing glass in ribbon form along a molten metal surface, thermally regulating the glass while it is in contact with that surface until the glass is sufficiently viscous to be raised from the bath drawing the ribbon substantially directly upwardly from the bath by tractive effort applied to the ultimate ribbon of desired thickness, selectively setting the speed of upward drawing of the ultimate ribbon at a value greater than the rate at which the ribbon is advanced along the molten metal so as to attenuate the ribbon of glass during its upward movement, subjecting the ribbon to a temperature gradient during its upward drawing, and regulating that temperature gradient so that the glass is sufficiently stiffened to arrest further dimensional change by the time it has been attenuated to the desired thickness.

2. A method of manufacturing flat glass of desired thickness, characterised by advancing glass in ribbon form along a bath of molten metal at a controlled rate, thermally regulating the glass while in contact with the bath so that the viscosity of the glass is in the range from $10^{5.5}$ to $10^{6.5}$ poises, drawing the ribbon substantially directly upwardly from the bath by tractive effort applied to the ultimate ribbon of desired thickness, regulating said upward drawing so that the ultimate ribbon is drawn at a rate from 2 to 4 times the rate of advance of the glass ribbon along the bath thereby reducing the thickness of the glass ribbon as it is upwardly drawn, subjecting the glass ribbon to a temperature gradient as it is upwardly drawn, and regulating the temperature gradient so that the glass achieves a viscosity in the range from $10^{7.5}$ to $10^9$ poises by the time its thickness has been reduced to said desired thickness.

3. A method according to claim 2, wherein the rate of upward drawing of the ribbon and the temperature gradient are so regulated as to achieve a reduction by half in the thickness of the ribbon in a height of from 3 to 7.5 meters.

4. A method of manufacturing flat glass of desired thickness, characterised by advancing glass in ribbon form along a bath of molten metal at a controlled rate, thermally regulating the glass while it is in contact with the bath so that the emperature of the glass is in the range from 800° C. to 850° C., drawing the ribbon of glass substantially directly upwardly by tractive effort applied to the ultimate ribbon of desired thickness, regulating said upward drawing so that the ultimate ribbon is drawn at a rate from 2 to 4 times the rate of advance of the glass ribbon along the bath and subjecting the glass ribbon to a temperature gradient in the range from 15° C./meter to 50° C./meter as it is upwardly drawn whereby the thickness of the ribbon is reduced to said desired thickness by the time the ribbon is sufficiently stiffened to hold its form.

5. A method of manufacturing flat glass in ribbon form comprising delivering glass at a controlled rate to a bath of molten metal and advancing the glass along the bath under thermal conditions which ensure that a layer of molten glass is established on the bath, maintaining said glass layer in molten condition until there is developed on the surface of the bath a buoyant body of molten glass by permitting said layer to flow laterally unhindered to the limit of its free flow, thereafter continuously advancing the buoyant body in ribbon form along the bath, cooling the ribbon as it is advanced until it is sufficiently viscous to be raised from the bath, bending the cooled ribbon away from the bath surface, drawing the ribbon substantially directly upwardly through by tractive effort applied to the ultimate ribbon of desired thickness, regulating the speed of upward drawing so that the ultimate ribbon is drawn at a rate from 2 to 4 times the rate of advance of the ribbon along the bath, and subjecting the ribbon to a temperature gradient in the range from 15° C./meter to 50° C./meter as it is upwardly drawn so that the suspended ribbon is attenuated by half by the weight of the glass acting against said tractive effort raising the ribbon by the time the ribbon achieves dimensional stability under the influence of said temperature gradient.

6. A method according to claim 5, wherein a substantially uniform viscosity is maintained across the ribbon passing through the bend.

7. A method according to claim 1, including guiding the upward bending of the ribbon away from the bath surface, to stabilise the position of removal of the ribbon from the bath surface.

8. A method according to claim 1, wherein the ribbon is drawn through a drawing chamber into an annealing tower so that the glass is suspended in the drawing chamber from the annealing tower, and the tractive effort is applied to the ribbon by pairs of drawing rollers gripping the glass in the annealing tower, the speed of which rollers may be varied.

9. Apparatus for manufacturing flat glass of desired thickness from a buoyant layer of molten glass supported on a bath of molten metal, comprising a tank structure holding a bath of molten metal and having an inlet to the bath, a roof bridging the tank structure, an upwardly elongated drawing chamber extending upwardly from said roof to a partially closed top and spaced from said inlet, means for delivering glass at a controlled rate through the inlet to the bath and advancing the glass along the bath, temperature regulators maintaining thermal conditions along the bath to ensure that the glass is advanced along the bath as a body of molten glass in ribbon form and is then cooled until it is sufficiently viscous to be bent away from the bath into the drawing chamber, means in the form of drawing rolls mounted above the top of the drawing chamber for applying a regulated tractive effort to the ribbon to draw the ribbon upwardly through the drawing chamber, and adjustable temperature regulating means within and extending along said drawing chamber to control the viscosity of the suspended ribbon of glass being raised through the chamber by establishing a temperature gradient in the chamber, whereby the ribbon of glass suspended in the drawing chamber is attenuated and is stiffened sufficiently to arrest any further dimensional change when it attains the desired thickness within the drawing chamber.

10. Apparatus according to claim 9, wherein the configuration of the tank structure is such that at the bath surface the width of the tank is greater than the width of the body of molten glass in ribbon form advanced along the bath, so as to permit unhindered lateral flow to the limit of its free flow of molten glass delivered to the bath to form said ribbon of glass.

11. Apparatus according to claim 9 wherein an annealing tower is mounted above the drawing chamber, and the drawing chamber has an outlet at its upper end through which the ribbon of glass is drawn into the annealing tower by pairs of drawing rolls engaging the ribbon of glass in the annealing tower, the ribbon being suspended in the drawing chamber from said rolls in the annealing tower.

12. Apparatus according to claim 9, including at least one duct opening into the drawing chamber and connected to a source of supply for maintaining a plenum of a chemically suitable gas in the drawing chamber and over the bath surface to inhibit the formation of contaminants for the glass, the outlet from the drawing chamber including a gas seal through which the ribbon of glass passes as it is discharged from the drawing chamber.

References Cited

UNITED STATES PATENTS

| 3,352,657 | 11/1967 | Charnock | 65—65 |
| 2,968,893 | 1/1961 | Pilkington | 65—65 |

FOREIGN PATENTS 638,874  4/1962  Italy.

DONALL H. SYLVESTER, *Primary Examiner.*

ARTHUR D. KELLOGG, *Assistant Examiner.*

U.S. Cl. X.R.

65—92, 99, 182, 199